Patented Jan. 14, 1941

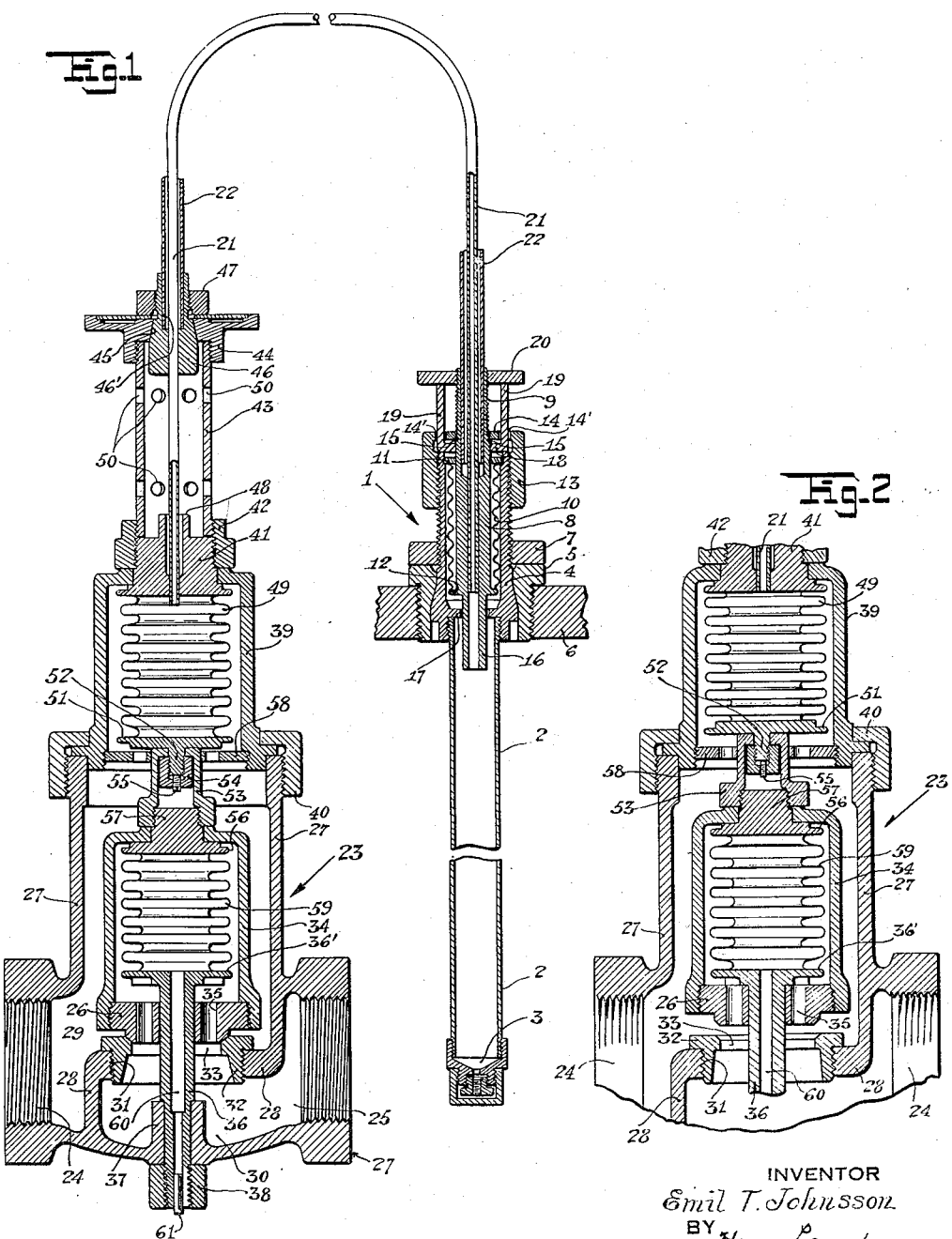

2,228,767

UNITED STATES PATENT OFFICE 2,228,767

THERMAL CONTROL DEVICE

Emil T. Johnsson, West Orange, N. J., assignor to Thomas A. Edison, Incorporated, West Orange, N. J., a corporation of New Jersey Application December 29, 1937, Serial No. 182,203

12 Claims. (Cl. 236—99)

This invention relates to thermal control devices and more particularly to an improved form of the device disclosed in my Patent No. 1,979,109 of October 30, 1934.

For controlling the temperature of various media, such as room temperature or the temperature of any gas or liquid, there may be employed means for introducing a controlled quantity of a suitable heating fluid of appropriate temperature into thermal relation with, or in direct contact with, the medium to be controlled. Such means commonly comprise a valve for controlling the flow of the heating fluid, and a temperature sensitive device, or thermostat, located so as to be affected by the medium to be controlled, and adapted to control or operate the valve in accordance with the temperature of the medium. In such thermal control devices it is highly desirable that the valve be operatively independent of pressure and temperature variations in the heating fluid, so that the operation of the valve may be a function only of the temperature of the medium to be controlled. The temperature of this medium may then be maintained at any desirable value with less deviation therefrom than would be otherwise possible.

It is an object of my invention to provide such improvements in thermal control devices as will improve their sensitivity of operation.

It is another object to provide in thermostatically controlled valves means whereby the valve operation is sensitive only to the temperature of the medium to be controlled.

It is another object to provide, in a thermostatically controlled valve for controlling the flow of a heating fluid, common means for maintaining the operation of the valve independent of pressure and temperature variations of the heating fluid.

It is another object to provide a structure having a valve that is thermostatically controlled by a single temperature variable.

It is still another object to provide improvements in thermal control devices which facilitate the assembly and adjustment of the device, and which reduces strain on its various parts during its assembly and operation.

Other and allied objects will more fully appear from the following description and the appended claims.

In the description of my invention reference is had to the accompanying figures, of which:

Figure 1 is an axial section of one embodiment of my thermal control device comprising a valve structure and thermostat connected by a tube, such tube being shown in elevation and partly broken away, and the valve being shown in closed position.

Figure 2 is a fragmentary axial section of the valve structure, showing the valve in open position.

Reference being had to Figure 1, there will be seen a temperature sensitive device, or thermostat 1, having a tubular container 2. The container 2 has a normally closed inlet opening 3 at its lower end, and is threaded at its upper end to a cylindrical member 4 which forms a continuation of the container. The outer surface of the member 4 is tapered adjacent the lower end thereof to form a seat for a rotatable union coupling 5 which is externally threaded for attachment to a tank 6 or any other support. The thermostat is secured to the coupling 5 by means of a lock nut 7 threaded on the member 4.

For varying the effective capacity of the container 2 there is provided, within the member 4, an axially movable plunger 8 having an upwardly projecting stem 9. The container 2 is sealed to the plunger 8 by means of a bellows 10 which is disposed about the plunger 8 and within the member 4. This bellows has a ring 11 at its outer end which is secured with a fluid-tight connection, as by soldering, to the upper end portion of the member 4. The bellows is similarly secured, at its inner end, to an annular flange 12 provided on the plunger 8.

For moving the plunger 8 in an axial direction there is provided a nut 13 which is threaded externally on the member 4. This nut has a centrally apertured end wall 14 which abuts against an annular shoulder 15 formed on the plunger 8 so that the plunger is forced inwardly, thereby reducing the effective capacity of the container 2, as the nut 13 is screwed inwardly on the member 4. Such inward movement will tend to rotate the plunger in the angular direction of the nut 13, and thus place a heavy torsional strain upon the bellows 10. For preventing such strain upon the bellows I provide an extension 16 on the plunger 8. This extension, which may have any suitable non-circular cross-section, such as a square, slidably engages with an inwardly extending flange 17 provided on the lower end portion of the member 4 and having an aperture of similar cross-section to that of the extension.

There is provided a spacer 18 having a centrally located aperture slidably receiving the stem 9 of the member 4. This spacer rests upon the rim of member 4 and has upwardly extending prongs 19 which extend through arcuate slots 14' provided in the end wall 14 of the nut 13. For holding the nut 13 in place there is provided a nut 20 which is threaded and turned down on the stem 9 until it tightly bears against the prongs 19 of the spacer 18. For a more detailed description of these locking means, and of the inlet opening 3 provided in the container 2, reference is had to my Patent No. 1,979,109.

Extending axially through the plunger 8 is a capillary tube 21 which is provided with a flexible casing 22. The plunger 8 is counter-bored to receive the casing 22, and the tube 21 and casing 22 are each suitably secured to the plunger 8, as by welding or soldering. The tube 21 connects the thermostat 1 with a valve structure 23. In operation the thermostat 1 and tube 21 are substantially filled with a suitable volatile liquid, and the thermostat 1 is placed in the medium whose temperature is to be controlled. Temperature variations of this medium will cause a contraction and expansion of this liquid in the container 2 in accordance with those temperature variations. By regulating the effective capacity of the container 2, as by the adjustment of the plunger 8, any given, or set temperature can be selected at which the container 2 and tube 21 are each completely filled with the volatile liquid. For temperatures exceeding this set temperature, there will be expelled from the end of the tube 21, and into the valve structure 23, an amount of volatile liquid in proportion to the amount of temperature rise above the set temperature. This expelled liquid is then suitably vaporized in the valve structure and utilized for operating the valve as is hereinafter described.

In a typical application of my invention, the medium to be controlled may be a liquid which is contained in the tank 6. The liquid of the tank 6 may be heated by any suitable heating fluid characterized by a minimum temperature—such, for example, as steam and this heating fluid may be brought into thermal relation with the liquid in any desired manner. The amount and temperature of the heating fluid which is brought into such relation with the medium to be controlled will determine the temperature of that medium. For controlling the amount of this heating fluid there is provided, in the structure 2, a valve whose operation is controlled by the thermostat 1.

It is highly important that such valves be operated only as a function of the temperature of the medium to be controlled, if the medium is to be held at any given temperature with but only small deviations therefrom. There are, however, other factors which will directly affect the operation of the valve unless they are properly guarded against. One of such factors is the pressure of the heating fluid, but balancing means well known in the art may be employed for annulling the effect of this pressure. Another such factor which may very seriously affect the valve operation is the temperature of the heating fluid, which temperature may of course have an entirely arbitrary relationship to that at which the medium is to be maintained. In practice, the temperature of the medium to be controlled will usually lag behind the temperature of the heating fluid at the valve structure; there will usually, however, not exist any fixed proportional relationship between these temperatures, particularly if the valve structure 23 is remote from the tank 6. It is therefore highly important that the valve structure be so constructed that it will be operatively insensitive to variations in its own temperature such as are caused by it being thermally exposed to the heating fluid. It is with new and improved means for operating the valve independently of pressure and temperature variations of the heating fluid, except of course for the effect which the temperature of such fluid has on the thermostat itself, that my invention is particularly concerned, wherefore these means are now described in detail.

The valve structure 23 comprises a housing 27 having the inlet passageway 24 and the outlet passageway 25, between which is located a partition 28 dividing the housing into an inlet chamber 29 and an outlet chamber 30. Formed in the partition 28 is a port 31 in which is mounted a valve seat 32 having an opening 33 which is adapted to be closed by the valve member 26. The valve member 26 is threaded into the lower end of an inverted cup-shaped casing 34 and is provided with perforations, such as 35, to permit the heating fluid to enter into the casing 34. It is adapted to slide on and be guided by a stationary guide post 36. This post projects through a boss 37 of the housing 27, and is secured to the housing by a nut 38 threaded on its outer end.

The housing 27 has a casing 39 attached to its upper end portion, the casing being adapted to be held thereto by a threaded annular coupling 40. The upper end of casing 39 is suitably closed by a flanged head or cap member 41 which is secured in position by a threaded annular coupling 42. Extending upwardly from the cap member 41, and threaded into the coupling 42, is an insulating tube 43 made of relatively low heat conducting material such as monel metal. Threaded on the upper end of the tube 43 is a coupling 44 having a tapered opening 45 through which extends a bushing 46 which firmly embraces the tube 21 and the casing 22, a suitable counterbore 46' being provided therein for the casing 22. Both the tube 21 and casing 22 are secured to the bushing 46 in any convenient manner as by welding. The bushing 46 is clamped to the coupling 44 by a nut 47 which is threaded on the bushing. The tube 21 extends axially through the tube 43 and also through a centrally located boss 48 of the cap member 41 to communicate with the interior of the valve structure 23. A suitable counterbore is formed in the boss 48 to provide clearance for the tube 21 so that it may be conveniently surrounded by a securing material such as solder.

The container 2 of the thermostat 1 and the capillary tube 21 are filled with a volatile liquid, which may be introduced through the inlet opening 3. Temperature variations of the thermostat cause contractions and expansions in the body of volatile liquid in the container 2, and therefore a varying quantity of the volatile liquid, in accordance with those temperature variations, will be introduced into the valve structure. This liquid is introduced into a vaporizing chamber or bellows 49 which is thermally exposed to the heating fluid. As the heating fluid is characterized by a minimum temperature which is in excess of the volatilizing temperature of the volatile liquid, this liquid will vaporize immediately upon being introduced into the vaporizing chamber to produce a large actuating pressure therein, in accordance with the amount of liquid introduced, for operating the valve member 26. It is in order that the volatile liquid shall not end to volatilize in the portion of the capillary tube 21 adjacent the vaporizing chamber, that there is provided the insulating tube 43, this being suitably perforated by the ports 50 to permit a free circulation of air about the adjacent portion of the tube 21. By this means here is formed a heat insulating and cooling chamber within the tube 43 by reason of which condensation of any vapor within this portion of the tube 21 is effected.

The bellows 49 is secured with a fluid-tight connection, as by welding, to the fixed head or cap 41 which forms a fixed end wall thereof. The bellows is similarly secured at its lower end to a disk-shaped closure member 51 forming a movable end wall thereof. This member has a downwardly projecting stem 52 which is swivellingly connected to a coupling member 53, as by a nut 54 threaded on this stem. The nut 54 is adjusted to a position permitting free swivelling of the member 53, and is locked in such position by means of a set screw 55 threaded through the end wall thereof. The upper end of the casing 34 is closed by means of a disk-shaped closure member 56. This member has an upwardly projecting stem 57 which threads into the coupling member 53 for rigidly holding the casing 34 thereto. The coupling member 53 extends slidably through a central opening in a disk 58 which is threaded into the lower end of the casing 39. This disk 58 is perforated to permit free flow of the heating fluid exteriorly of the bellows 49, the perforations being small, however, so that any hard particles that may be contained in the heating fluid cannot damage the bellows 49 by impingement thereon. The disk 58 also facilitates the assembly of the valve structure in that it holds the closure member 51 of the bellows 49 in its proper mechanical relation during the assembling operation.

It is obvious from this construction that the closure member 51 of the bellows 49 is connected to the valve member 26 by the casing 34. These parts form a valve assembly which is movable upwardly and downwardly for respectively opening and closing the valve, this movement being guided by the slidable engagement of the valve member 26 with the stationary post 36 and of the coupling member 53 with the disk 58. The guide post 36 has, at its upper end, a disk-shaped portion 36' which acts as a stop for limiting the upward movement of the valve member 26. The valve member 26 is obviously limited in its downward movement by its engagement with the valve seat 32. The movable valve assembly is adjusted relative to the disk 58 so that the closure member 51 does not engage with the disk 58 when the valve member rests in its closed position.

In order that the valve member 26 may move upwardly and downwardly independently of the pressures in the inlet and outlet chambers, the valve assembly must be balanced with respect to these pressures. When the valve is closed the valve assembly is balanced with respect to the pressure exerted upon it from the inlet chamber 29 by making the effective diameter of the bellows 49 equal to that of the opening 33 in the valve seat 32, it being understood that the bellows 49 is not responsive to pressure exerted radially upon it. However, any pressure in the outlet chamber would, unless its effect were nullified, be exerted upwardly against the face of the closure member 56, and therefore tend to move the valve assembly upwardly. For nullifying this effect a bellows 59 is interposed between the closure member 56 and the stationary disk 36', it being secured with a fluid-tight connection to 56 and 36', as by welding. Such bellows must be sealed, or else atmospheric pressure will exert an upward force upon the closure member 56 and thereby unbalance the valve assembly. Since these bellows are particularly weak against torsional strain, a swivelling coupling is provided between the casing 34 and the bellows 49 so that the bellows are not subjected to such strains, as during the assembly of the valve structure.

It is a distinct feature of my invention that the bellows 59, as here provided, performs other functions over and above that of balancing the valve assembly with respect to external pressures exerted thereon. The introduction of a quantity of gas into the bellows 59 will cause the bellows to act as a resilient device in opposed relation to the actuating pressure created by the vaporization of the controlling volatile liquid introduced into the bellows 49. Such gas may be introduced by way of an axial opening 60 provided in the guide post 36, which opening is then sealed by a plug 61. The pressure exerted by this compressed gas in the bellows 59 tends to resiliently hold the valve member 26 in open position against the disk 36', for all actuating pressures within the bellows 49 which are less than that in the bellows 59. It is of course inherent in this arrangement that the internal pressure exerted by this gas in the bellows 59 will act to oppose the pressure of the heating fluid tending to collapse the bellows.

It is also obvious that the bellows 49 will act as a resilient device whenever it contains any given quantity of gaseous matter. Moreover, the resilience of this device is proportional to the quantity of such matter contained therein for any given volume, and therefore this resilience will vary in accordance with the amount of volatile liquid introduced therein, it being understood that this liquid is vaporized immediately upon being so introduced.

As the temperature at the thermostat container 2 rises, the volatile liquid expands, and when the set temperature has been reached, some of the liquid is forced into the vaporizing chamber or bellows 49 where it is vaporized. This creates an actuating pressure in this bellows. When this actuating pressure exceeds the pressure exerted by the bellows 59 the valve assembly will move downwardly to close the valve.

As the temperature at the thermostat drops, the liquid contracts, thereby relieving the pressure in the bellows 49 and causing vapor to pass from the latter into the adjacent portion of the capillary tube 21 wherein it is condensed. The reduced pressure in the bellows 49 causes an unbalance in the forces exerted upon the valve assembly, as by the pressure exerted by the bellows 59 exceeding that exerted by the bellows 49, to force the valve assembly upwardly to open the valve.

The actuating pressure exerted within the bellows 49 is not only a function of the amount of volatile liquid introduced therein, but also a function of the temperature of the heating fluid which exteriorly surrounds the bellows; or, in other words, the actuating pressure is the result of two variables, the amount of liquid injected in the bellows and the temperature of the heating fluid, the effects of which are, generally speaking, superimposed on one another. After vaporization has occurred within the bellows the vapor behaves according to the laws of a perfect gas, and therefore the actuating pressure is responsive to the temperature of the gas. Likewise, the resilience of the bellows will be responsive to this temperature. Temperature variations of the heating fluid therefore cause a varying resilience of, or actuating pressure within, the bellows 49 so that the temperature of the heating fluid will tend to affect the operation of the valve—which is highly undesirable. It is, however, a feature of my invention that the actuating pressure within, or the resilience of, the bellows 59, which contains a quantity of any suitable gas, will likewise be responsive to temperature according to the laws of a perfect gas. This bellows is in operatively opposed relation to the bellows 49, and each bellows is thermally exposed to the heating fluid. It is to be understood that when the valve is open the heating fluid exteriorly surrounds each bellows, and when the valve is closed, the bellows 59, although shut off from the inlet chamber, is maintained substantially at the temperature of the heating fluid in the inlet chamber by reason of the proximity of the casing 34 to the bellows 59. Therefore according to my invention, temperature effects in one of the bellows are equally and oppositely opposed by temperature effects in the other of the bellows, and consequently, the valve operation is independent of all temperatures of the heating fluid exceeding the volatilizing temperature of the volatile liquid. The operation of my thermal control device is thus controlled by, or responsive to, a single temperature variable, this temperature variable being that of the medium to be controlled.

Although I have shown and described but a single preferred embodiment of my invention, it will be understood that many changes and modifications of the construction shown may be made without departing from the scope of my invention which I now undertake to express according to the following claims.

I claim:

1. In a structure having a valve for controlling the flow of a heating fluid: the combination of a first valve-controlling resilient device maintained substantially uniformly throughout at the temperature of said heating fluid and responsive in its resilience to its own temperature changes; a second valve-controlling resilient device operatively opposed to said first device and also maintained substantially uniformly throughout at the temperature of said heating fluid; means for causing said second device to respond in its resilience to its own temperature changes in substantially the same degree as that in which the first of said devices responds to its own temperature changes; and means, directly operatively connected with one of said resilient devices, for exercising over the resilience thereof a controlling influence superimposed upon the influence on that device of its own temperature changes.

2. In a structure including a valve: the combination of a first valve-controlling force-generating device maintained substantially uniformly throughout at the same temperature and responsive in its generated force to changes in that temperature; a second valve-controlling force-generating device operatively opposed to and maintained substantially uniformly throughout at the temperature of said first device; means included within second device for causing the same to respond in its generated force to its own temperature changes in substantially the same degree as that in which the first of said devices responds to its own temperature changes; and temperature-responsive means, directly operatively connected with one of said devices and actuated externally of that device, for further controlling the force generated by said one device.

3. In a structure having a valve for controlling the flow of a heating fluid: the combination of a force-generating device for moving said valve in one of its movable directions, exposed to said heating fluid and responsive in its force to the temperature and pressure of the heating fluid; a second force-generating device exposed to said heating fluid and operatively opposed to said first-mentioned force-generating device for moving said valve in the other of its movable directions; and means included within said second force-generating device for causing the latter to respond in its force to variations in the pressure and temperature of said fluid substantially identically with said first-mentioned force-generating device whereby to render the movement of said valve substantially independent of both pressure and temperature variations of said fluid.

4. In a structure having a valve for controlling the flow of a heating fluid: in combination; a motor bellows for operating said valve; a temperature-responsive device comprising a bulb completely filled with a volatile liquid and connected with said motor bellows to introduce thereinto a quantity of said liquid is proportion to the temperature of said bulb, said motor bellows being exposed to said heating fluid to cause volatilization of the liquid introduced therein; and means, comprising a sealed bellows also exposed to said heating fluid and containing a quantity of gas, for counteracting said motor bellows to maintain the operation of said valve substantially independent of variations in the temperature of said heating fluid.

5. In a structure having a valve for controlling the flow of a heating fluid which is characterized by a minimum temperature: in combination, means for operating said valve comprising a contractible and expansible motor chamber heated by and maintained substantially at the temperature of said heating fluid; a temperature-responsive device adapted to introduce into said chamber a quantity of volatile liquid which is in proportion to the temperature of said device and substantially independent of the pressure in said chamber, said liquid having a volatilizing temperature below the minimum temperature of said heating fluid whereby to cause complete volatilization of the liquid in said chamber; and a sealed expansible and contractible chamber containing a quantity of gas and maintained substantially at the temperature of said heating fluid for counteracting pressure variations in said motor chamber caused by temperature variations of said heating fluid, whereby to render the operation of said valve substantially independent of the temperature of said heating fluid at all temperatures thereof exceeding said minimum temperature.

6. In a structure having a valve for controlling the flow of a heating fluid: the combination of a motor bellows for operating said valve; a thermostatic device connected with said motor bellows and adapted to introduce volatilizable liquid thereinto, the quantity of the liquid introduced into the motor bellows being controlled substantially only by the temperature of said thermostatic device and the motor bellows being maintained substantially at the temperature of said heating fluid to cause volatilization of the liquid contained therein, whereby the pressure in the motor bellows is controlled substantially entirely by the temperatures of said thermostatic device and of said heating fluid; and a sealed bellows containing a predetermined quantity of volatile fluid and maintained also substantially at the temperature of said heating fluid for counteracting pressure variations in said motor bellows due to temperature variations of said heating fluid, whereby to render the operation of said valve subject substantially only to the temperature of said thermostatic device.

7. In a structure having a valve movable between open and closed positions to control the flow of a heating fluid: the combination of a motor bellows for moving said valve in one of its movable directions; a completely liquid-filled thermostat for introducing a charge of volatile liquid into said bellows in proportion to the temperature of the medium to be controlled, said bellows being exposed to said heating fluid to cause complete volatilization of said charge; and biasing means for causing said valve to be moved in the other of its movable directions when the pressure in said motor bellows is relieved, consisting of a single bellows directly exposed to said heating fluid and operatively opposed to said motor bellows, said latter bellows being sealed and gas-filled whereby to render the biasing of the valve responsive to temperature of the heating fluid in substantially the same degree as that in which said motor bellows is responsive to the temperature of the heating fluid.

8. In a structure having a valve for controlling the flow of a heating fluid: the combination of a valve-operating bellows directly exposed to said heating fluid and responsive to the pressure thereof; and means for rendering the operation of said valve independent of variations in pressure of said heating fluid, comprising a compensating bellows operatively opposed to said valve-operating bellows and also directly exposed to said heating fluid, said compensating bellows being sealed and filled with a volatile fluid, the internal pressure in said bellows provided by said volatile fluid acting to oppose the collapsing effect of the external pressure of the heating fluid on the compensating bellows.

9. In a structure having a valve for controlling the flow of a heating fluid: the combination of means for operating said valve, comprising a motor bellows adapted to receive a charge of volatile liquid, and thermostatic means for causing said motor bellows to be charged with said liquid in a quantity proportional to the temperature of the medium to be controlled and independent of the pressure in said motor bellows, said motor bellows being directly exposed to said heating fluid to volatilize said charge and being rendered responsive to the pressure of the heating fluid by reason of its said direct exposure; and means for maintaining the operation of said valve substantially independent of both temperature and pressure variations of said heating fluid, comprising a single compensating bellows operatively opposed to said motor bellows, sealed to contain a predetermined quantity of volatile fluid and directly exposed to said heating fluid.

10. In a structure having a valve for controlling the flow of a heating fluid: the combination of a motor bellows for operating said valve; a temperature-responsive device comprising a bulb completely filled with a volatile liquid and connected with said bellows to introduce thereinto a quantity of said liquid in proportion to the temperature of said bulb, said bellows being directly exposed to said heating fluid to cause volatilization of the liquid introduced thereinto; and a sealed, gas-filled bellows, directly exposed to said heating fluid and operatively opposed to said motor bellows, for counterbalancing said motor bellows to render the operation of said valve substantially independent of both pressure and temperature variations of said heating fluid.

11. In a structure having a valve for controlling the flow of a heating fluid: the combination of a pressure-operated motor bellows for moving the valve in one of its movable directions, said motor bellows being exposed to said heating fluid and responsive to the pressure thereof; and a unitary means for compensating for the pressure effect of said heating fluid on said motor bellows and for biasing said valve to cause the same to be moved in the other of its movable directions when the pressure in said motor bellows is relieved, comprising a bellows exposed to said heating fluid and operatively opposed to said motor bellows, said latter bellows being sealed and filled with volatile fluid, the pressure provided by said fluid acting to oppose the pressure exerted on said latter bellows by said heating fluid and causing a predetermined temperature-responsive biasing of said valve in said other of its movable directions.

12. In a structure having a valve for controlling the flow of a heating fluid: the combination of means for moving said valve in one of its movable directions comprising a motor bellows and a thermostatic device including a bulb completely filled with volatile liquid and connected with said bellows to introduce thereinto a quantity of said liquid in proportion to the temperature of said bulb, said bellows being maintained at the temperature of said heating fluid to cause volatilization of the liquid introduced thereinto; and a sealed bellows operatively opposed to said motor bellows, said sealed bellows being also maintained at the temperature of said heating fluid and filled with a predetermined quantity of gas, whereby to compensate for the pressure variations in said motor bellows caused by temperature variations of said heating fluid and whereby also to provide a temperature-responsive biasing of said valve for causing the valve to be moved in the other of its movable directions when the pressure in said motor bellows is relieved.

EMIL T. JOHNSSON.

CERTIFICATE OF CORRECTION.

Patent No. 2,228,767. January 14, 1941.

EMIL T. JOHNSSON.

It is hereby certified that error appears in the printed specification of the above numbered patent requiring correction as follows: Page 2, first column, line 41, after the word "steam" insert a dash; line 49, for the reference numeral "2" read --23--; same page, second column, line 73, for the word "end" read --tend--; page 3, first column, line 4, for "here" read --there--; page 4, second column, line 31, claim 4, for "is" read --in--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.